Nov. 24, 1953    O. C. SEVERSON    2,659,963
TOOLHOLDER
Filed Dec. 30, 1950
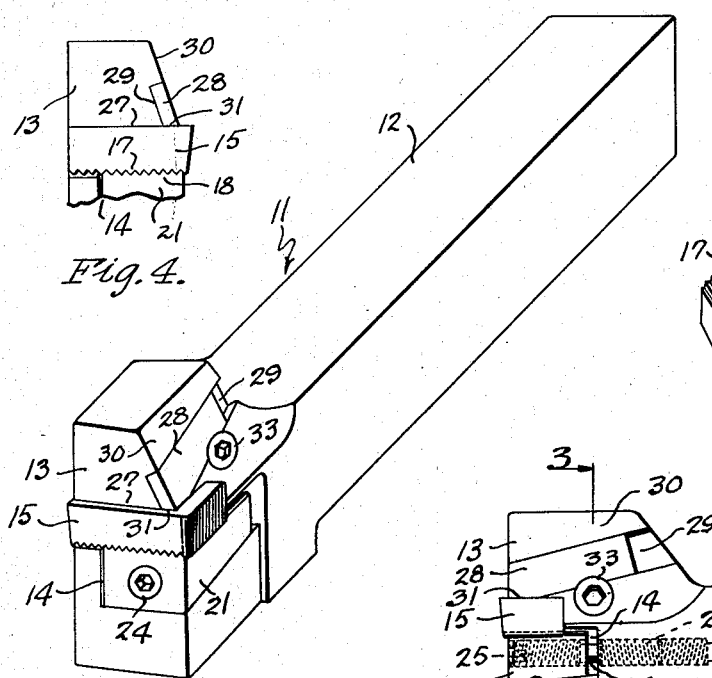
Fig. 1.
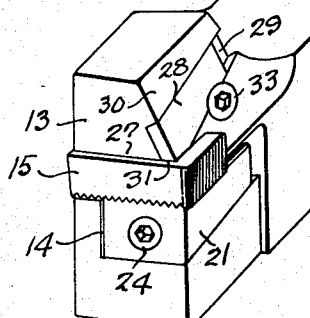
Fig. 4.
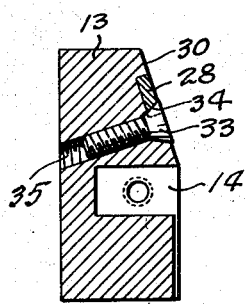
Fig. 3.
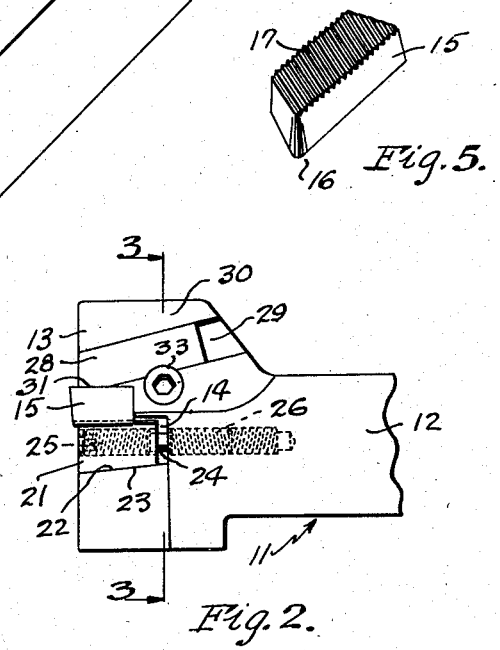
Fig. 2.
Fig. 5.
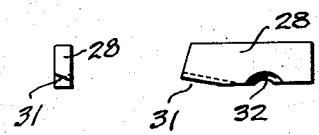
Fig. 6.    Fig. 7.
Inventor
Ole C. Severson
By Wooster & Davis, Attorneys Patented Nov. 24, 1953

2,659,963

UNITED STATES PATENT OFFICE 2,659,963

TOOLHOLDER

Ole C. Severson, Derby, Conn., assignor to The Viking Tool Company, Shelton, Conn., a corporation of Connecticut Application December 30, 1950, Serial No. 203,687

2 Claims. (Cl. 29—96)

This invention relates to cutters for use on machine tools and particularly to chip breakers for cutting tools of this type, especially for single point turning tools and similar tools.

An object of this invention is to provide a chip breaker formed of a hard wear-resisting material such as tungsten carbide or the like, constructed and arranged to be secured in place on a cutter tool body or bar, for example, without brazing or bonding, whereby to avoid cracking the carbide as a result of the difference in expansion between the carbide chip breaker and the cutter body or bar of softer metal.

A further object is to provide a removable chip breaker constructed and arranged to permit replacement when desired without disturbing the clamping member which secures the cutting bit in place.

A still further object is to provide a replaceable chip breaker for cutting tools arranged to be secured more or less permanently in place and not have to be disturbed when changing or adjusting the cutting bit.

A still further object is to provide a cutting tool having an improved chip breaker arranged to prevent clogging of the chips between the bit and the chip breaker.

With the foregoing and other objects in view, I have devised the construction illustrated in the accompanying drawing forming a part of this specification. It is, however, to be understood the invention is not limited to the specific details of construction and arrangement shown but may embody various changes and modifications within the scope of the invention.

In this drawing:

Fig. 1 is a perpective view of a single point cutting tool having a chip breaker constructed in accordance with one embodiment of the invention;

Fig. 2 is a side elevation of the end of the cutter body or bar shown in Fig. 1;

Fig. 3 is a transverse section on the line 3—3 of Fig. 2 showing the manner of securing the chip breaker in place in the illustrated embodiment;

Fig. 4 is a front end view of a portion of the cutting tool shown in Figs. 1 and 2;

Fig. 5 is a perspective view of the cutting bit shown in the illustrated embodiment, and Figs. 6 and 7 are end and side elevations, respectively, of the chip breaker element shown in Figs. 1 to 4.

As illustrated in the drawing, the invention is shown in connection with a single point cutting tool 11 including the cutter bar, body or shank 12 of steel or the like, adapted to be secured, for example, to the tool post of a lathe or the tool holder of some other machine tool (not shown). An enlarged head 13 at one end of the bar 12 has a recess 14 for receiving a cutting bit 15 which, as shown in Fig. 5, is of generally rectangular form having a cutting point 16 and ribs and grooves 17 along the bottom face adapted to cooperate with similar ribs and grooves 18 on the top of a wedge-shaped clamping block 21. The clamping block 21 has a tapered lower surface 22 slidably engaging an inclined surface 23 at the bottom of the recess 14. A block-operating clamping screw 24 having its opposite ends oppositely threaded with right and left hand threads 25, 26, respectively threaded to the clamping block 21 and the cutter bar 12, is employed to operate the block to clamp or release the cutting bit 15. When securely clamped in the recess 14 as shown in Fig. 1, the bit 15 is pressed firmly against the clamping face 27 formed by the upper surface of the recess 14.

In the illustrated embodiment, a chip breaker 28 of generally rectangular shape and preferably formed of a relatively hard, wear-resistant material, such as a tungsten or other suitable carbide, is secured in a slot or channel 29 formed in an inclined outer face 30 on the head 13. The slot 29 is inclined downwardly to intersect the clamping face 27 at the top of the bit-receiving recess 14, see Figs. 1 and 2. The chip breaker 28 has a bit-engaging surface 31 on one edge and an adjacent notch 32 in its lower edge to receive the tapered head 33 of a locking screw 34 threaded into an opening 35 in the head 13 to lock the chip breaker 28 in the slot 29. The bit-engaging surface 31 on the chip breaker 28 is ground on such an angle that it is flush with the clamping face 27 of the recess 14 so that the bit 28 will be pressed tightly into engagement therewith when secured in the recess 14. This insures a close contact between the bit and the breaker so that no chips can accumulate and clog the cutter by getting in between the chip breaker and the top surface of the bit. The face 30 on the head 13 is inclined at a determinate angle in order to support the chip breaker 28 at the correct angle for the particular work for which the holder is designed. The degree of inclination may vary for different types of work and different materials being worked on to insure breaking up of the chips. As illustrated, the chip breaker 28 and the slot 29 are so proportioned that the surface of the breaker is flush with the face 30 of the head 13. The face 30 is also located at the proper place to insure the chip breaker 28 being correctly positioned with relation to the cutting point 16.

Even though not brazed or similarly bonded to the holder, the chip breaker 28 is retained permanently in place and need not be disturbed when the cutting bit 15 is removed for sharpening, or when it is adjusted to proper cutting position in the recess 14. However, the breaker 28 can be readily removed from the slot 29 for replacement when necessary, and this can in turn be done without disturbing the adjustment of the cutting bit 15. No bonding or brazing is needed to secure the breaker in place so that all danger of cracking a carbide breaker because of unequal heating of the carbide and the adjacent steel is eliminated. When the chip breaker surface becomes worn, the member 28 is merely removed and replaced with a new element, and it is therefore not necessary to discard the body or bar 12 as would be the case where the inclined surface 30 of the body is used as the chip breaker.

Having thus set forth the nature of my invention, I claim:

1. A cutting tool comprising a cutter bar having an integral head portion at one end provided with a transverse bit-receiving recess including a bit-engaging clamping surface forming the top face of the recess, said head portion including an outer face inclined upwardly and backwardly from said clamping surface, said head portion being provided with an upwardly and rearwardly inclined slot in said inclined outer face leading at its lower end to said clamping face, a chip breaker comprising a block detachably mounted in said slot having an inclined lower surface flush with the top clamping surface of the recess, a cutting bit mounted in the recess, a clamping block supported on the lower surface of the recess under the cutting bit, and means for shifting the clamping block to clamp the cutting bit against said clamping surface of the recess and the lower surface of the chip breaker.

2. A cutting tool comprising a cutter bar having an integral head portion at one end provided with a transverse bit-receiving recess including a top surface forming a clamping face and an inclined surface at the lower side of the recess, said head portion including an outer face inclined upwardly and backwardly from said clamping face and upwardly and backwardly provided with an inclined channel terminating at its lower end in said clamping face, a chip breaker comprising a block detachably mounted in said channel and provided with a lower surface flush with said clamping face, a cutting bit mounted in the recess with its top surface engaging said clamping face and the lower surface of the chip breaker, a clamping block in the recess under the cutting bit and provided with an inclined lower surface on the lower surface of the recess, and means for shifting the clamping block to clamp the top surface of the cutting bit against the top face of the recess and the lower surface of the chip breaker.

OLE C. SEVERSON.

References Cited in the file of this patent

UNITED STATES PATENTS

| Number | Name | Date |
| --- | --- | --- |
| 1,854,672 | Robinson et al. | Apr. 19, 1932 |
| 2,096,137 | Shaw | Oct. 19, 1937 |
| 2,181,023 | Moore | Nov. 21, 1939 |
| 2,275,326 | Severson | Mar. 3, 1942 |
| 2,527,978 | Wood | Oct. 31, 1950 |